United States Patent
Sun et al.

(10) Patent No.: US 8,256,955 B2
(45) Date of Patent: Sep. 4, 2012

(54) INDUCTION TYPE OF ELECTRONIC THERMOMETER PROBE MOTION DETECTION DEVICE

(75) Inventors: Jifan Sun, Nanshan Shenzhen (CN);
Zhao Qin, Nanshan Shenzhen (CN);
Lingfeng Kong, Nanshan Shenzhen (CN)

(73) Assignee: Edan Instruments, Inc. (CN)

( * ) Notice: Subject to any disclaimer, the term of this patent is extended or adjusted under 35 U.S.C. 154(b) by 523 days.

(21) Appl. No.: 12/494,730

(22) Filed: Jun. 30, 2009

(65) Prior Publication Data

US 2010/0329305 A1 Dec. 30, 2010

(51) Int. Cl.
*G01K 7/36* (2006.01)
(52) U.S. Cl. ........ 374/184; 374/163; 374/183; 374/208; 374/141
(58) Field of Classification Search .................. 374/163, 374/164, 170, 185, 184, 100, 141, 148, 208, 374/120; 340/870.17; 600/549, 474; 116/216; 702/130–136, 139
See application file for complete search history.

(56) References Cited

U.S. PATENT DOCUMENTS

| | | | | | |
|---|---|---|---|---|---|
| 3,550,448 | A | * | 12/1970 | Ensign | 374/141 |
| 4,186,419 | A | * | 1/1980 | Sims | 361/178 |
| 4,503,862 | A | * | 3/1985 | Baessler | 600/549 |
| 4,556,837 | A | * | 12/1985 | Kobayashi et al. | 320/108 |
| 4,612,537 | A | * | 9/1986 | Maltais et al. | 340/596 |
| 4,684,869 | A | * | 8/1987 | Kobayashi et al. | 320/108 |
| 6,082,893 | A | * | 7/2000 | Kassa | 374/141 |
| 6,149,297 | A | * | 11/2000 | Beerwerth et al. | 374/121 |
| 6,634,789 | B2 | * | 10/2003 | Babkes | 374/208 |
| 7,021,824 | B2 | * | 4/2006 | Wawro et al. | 374/208 |
| 7,794,142 | B2 | * | 9/2010 | Clothier et al. | 374/163 |
| 2003/0002562 | A1 | * | 1/2003 | Yerlikaya et al. | 374/208 |
| 2005/0249263 | A1 | * | 11/2005 | Yerlikaya et al. | 374/209 |
| 2006/0264730 | A1 | * | 11/2006 | Stivoric et al. | 600/390 |
| 2007/0019709 | A1 | * | 1/2007 | Wang | 374/208 |
| 2009/0323761 | A1 | * | 12/2009 | Tsai | 374/148 |
| 2010/0329303 | A1 | * | 12/2010 | Yu et al. | 374/164 |
| 2011/0191058 | A1 | * | 8/2011 | Nielsen et al. | 702/130 |

FOREIGN PATENT DOCUMENTS

DE 3228524 A1 * 2/1984

* cited by examiner

*Primary Examiner* — Gail Verbitsky
(74) *Attorney, Agent, or Firm* — Garcia-Zamor IP Law; Ruy M. Garcia-Zamor

(57) ABSTRACT

The invention discloses an induction type of electronic thermometer probe motion detection device, including a probe and a probe holder; wherein the probe includes a cavity and a probe tip; Inside the probe tip has a heating mechanism, wherein the probe tip and the heating mechanism electrically connected with the host of the electronic thermometer by wires; Inside the cavity locates a magnetic inductive switch, wherein the magnetic inductive switch communicates with the host of electronic thermometer by wires; A magnetic signal source located in the position of the other side of the probe holder after the placement of the probe, where corresponds to the magnetic inductive switch, and then the magnetic signal source and the magnetic inductive switch composed to the probe motion detection device. When the probe put back to the probe holder, the magnetic inductive switch will induce the magnetic signal source in the probe holder, and the magnetic inductive switch is on the closed mode and communicates with the host of the electronic thermometer by wire, then turns off the pre-heating process; Likewise, when the probe leave the probe holder, the magnetic inductive switch is not able to induce the magnetic signal source, and the magnetic inductive switch is on the open mode and communicates with the host of the electronic thermometer by wire, then initiates the pre-heating process.

5 Claims, 4 Drawing Sheets

INDUCTION TYPE OF ELECTRONIC THERMOMETER PROBE MOTION DETECTION DEVICE

TECHNICAL FIELD

The invention relates to an assembly of electronic thermometer probe, especially refers to an induction type of electronic thermometer probe motion detection device.

BACKGROUND ART

The existing and commonly used clinical thermometer can roughly be divided into two types, which is contact-type and non-contact-type, wherein the contact-type clinical thermometer is mainly two types as mercury clinical thermometers and electronic clinical thermometer. The electronic clinical thermometer does not use metal mercury, and the afraid for the dangerous of the overflow of the break of the clinical thermometer is unnecessary, meanwhile the reading is straightforward, and easy to operate, therefore it is more and more applied to the hospital and household.

The electronic clinical thermometer usually needs to draw support from the probe tip or probe to contact with the body for the measurement, and the error of the measurement is big, and the time for the measurement is long. In order to reduce the error, accelerate measuring the speed, usually we will adopt the way by which to pre-heat the probe tip or the probe, so that it will speed up the temperature of the probe tip or the probe to close with human body temperature, and then carry on the measure. However, to realize pre-heating of the probe tip or probe, we need the host of electronic thermometer has a validity way to check the motion of the probe tip and the probe, to know when to initiate the pre-heating process, and when to reset.

The American patent with a patent number of U.S. Pat. No. 7,021,824 discloses a switch device for a thermometer, which comprises a base installed on a circuit board, a probe, a probe bracket, a photonic transmitter and a photodetector. The switch device can detect the probe controlling action by using a powder supply, and cannot work without a circuit board. The switch device has the defects of complicated structure and high manufacturing cost.

CONTENTS OF THE INVENTION

Aiming at the shortcomings above in existing technology, this invention is to provide an induction type of electronic thermometer probe motion detection device with a simple structure and is able to operate without the power of electrical source.

To achieve the objective above, this invention adopts the following technical solution:

An induction type of electronic thermometer probe motion detection device, including a probe and a probe holder; wherein the probe includes a cavity and a probe tip; Inside the probe tip has a heating mechanism, wherein the probe tip and the heating mechanism electrically connected with the host of the electronic thermometer by wires; Inside the cavity locates a magnetic inductive switch, wherein the magnetic inductive switch communicates to the host of electronic thermometer by wires; A magnetic signal source located in the position of the other side of the probe holder after the placement of the probe, where corresponding with the magnetic inductive switch, and then the magnetic signal source and the magnetic inductive switch composed to the probe motion detection device.

The foresaid magnetic inductive switch is CMOS magnetic resistance inductive switch, includes MR magnetic resistance element and CMOS switch.

The foresaid magnetic signal source is magnet.

The foresaid magnetic signal source is annular magnet.

The foresaid magnet is in ring structure.

By adopting the above structure, when the probe put back to the probe holder, the magnetic inductive switch will induce the magnetic signal source in the probe holder, and the magnetic inductive switch is on the closed mode and communicates with the host of the electronic thermometer by wire, then turns off the pre-heating process; Likewise, when the probe leave the probe holder, the magnetic inductive switch is not able to induce the magnetic signal source, and the magnetic inductive switch is on the open mode and communicates with the host of the electronic thermometer by wire, then initiates the pre-heating process. The invention is with a simple structure, high sensitivity and stable function.

MODE OF CARRYING OUT THE INVENTION

Figure 1:
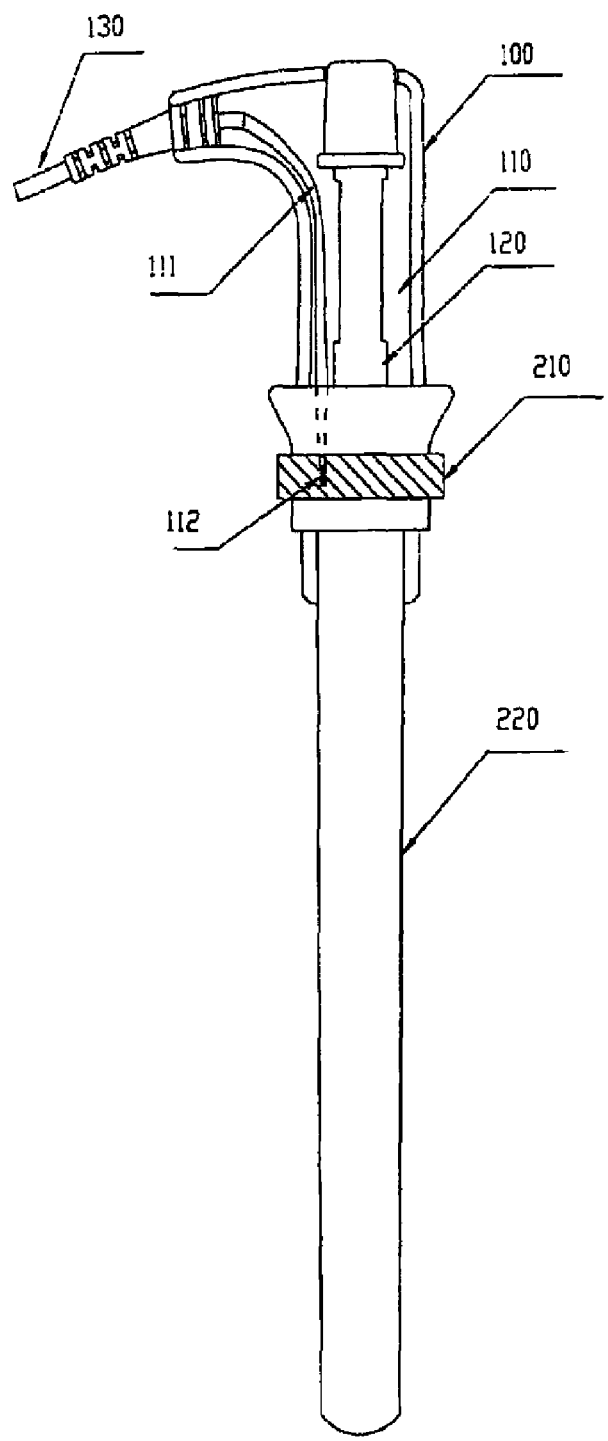
FIG. 1 is a structure figure of the invention.
Figure 2:
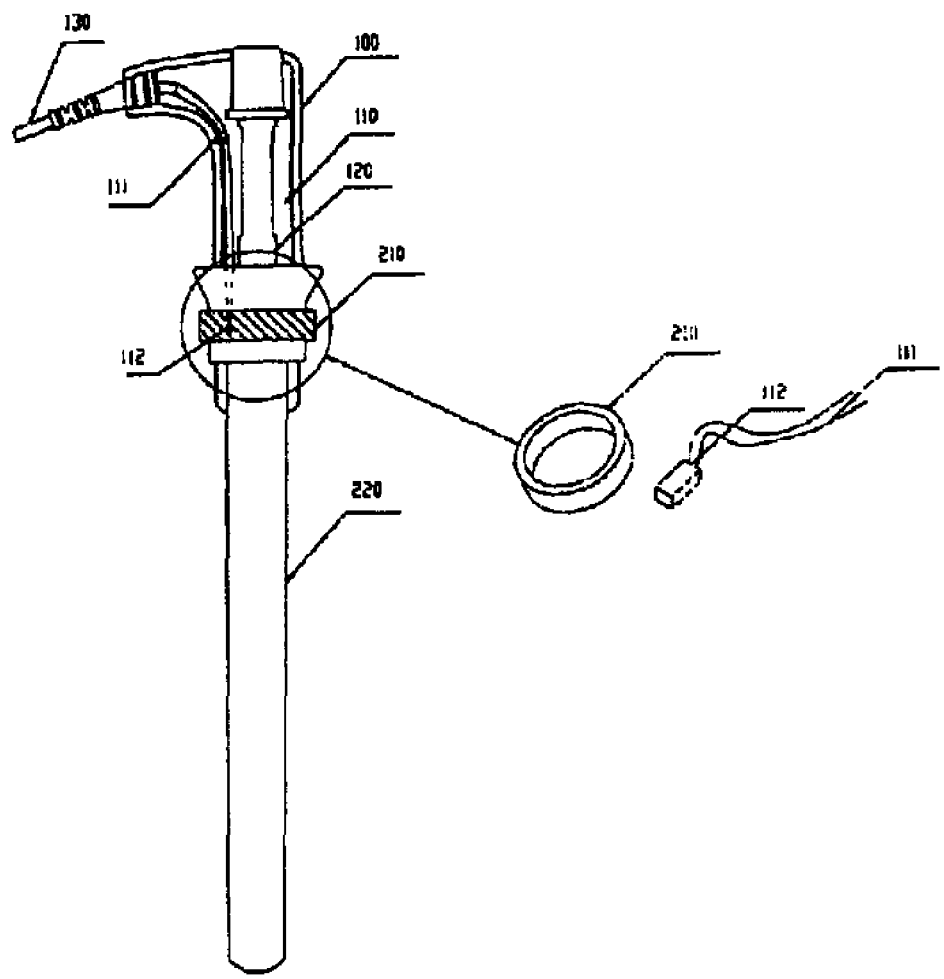
FIG. 2 is a structure figure of the invention illustrating the switch within the cavity, illustrating the magnet source on the other side, and illustrating the magnet source being in the shape of a ring.

Further explanation to the invention will be stated below combining with the attached figures and the mode of carrying out the invention:

As shown in FIGS. 1 and 2, an induction type of electronic thermometer probe motion detection device, including a probe 100 and a probe holder 220; wherein the probe 100 includes a cavity 110 and a probe tip 120; Inside the probe tip 120 has a heating mechanism, wherein the probe tip 120 and the heating mechanism electrically connected with the host of the electronic thermometer by wires 111 of the connecting line 130 of the probe; Inside the cavity 110 locates a magnetic inductive switch 112, wherein the magnetic inductive switch 112 communicates to the host of electronic thermometer by wires 111. The magnetic inductive switch is CMOS magnetic resistance inductive switch, includes MR magnetic resistance element and CMOS switch. An annular magnet 210 located in the position of the other side of the probe holder after the placement of the probe 100, where corresponding with the magnetic inductive switch 112, and then the annular magnet 210 and the magnetic inductive switch 112 composed to the probe motion detection device.

Figure 3:
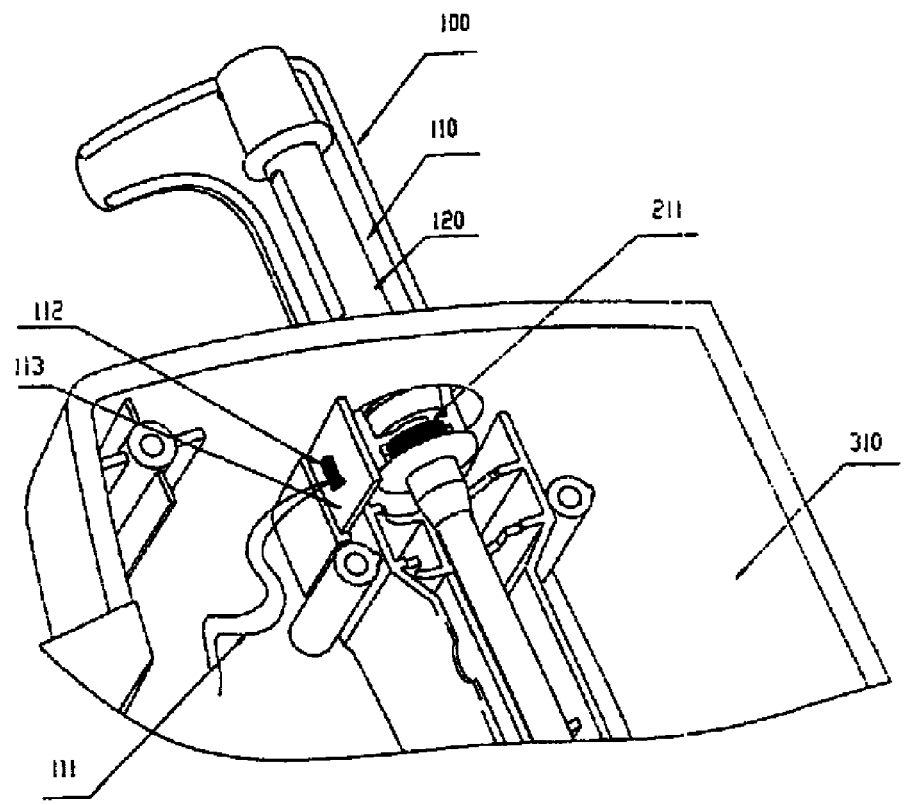
FIG. 3. is a structure figure of another mode of the implementation of the invention.
Figure 4:
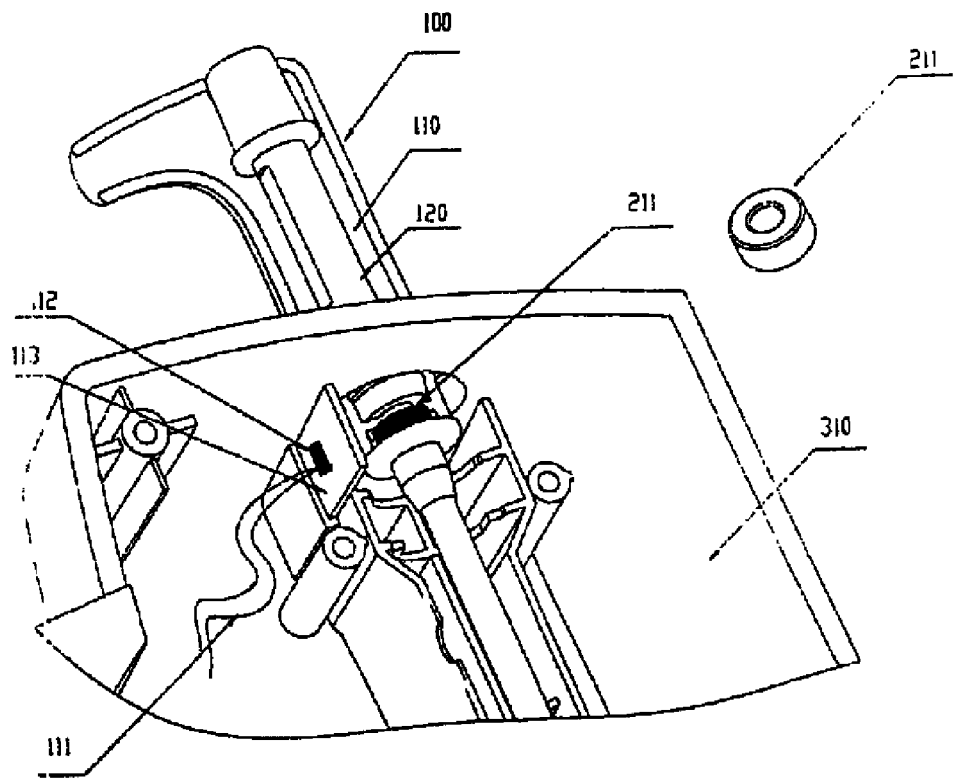
FIG. 4 is a structure figure of another mode of the implementation of the invention illustrating the switch within the cavity, illustrating the magnet source on the other side, and illustrating the magnet source being in the shape of a ring.

As shown in FIGS. 3 and 4, for another mode of the implementation of the invention, it mainly exchanges the location of magnetic inductive switch 112 with the annular magnet 211, wherein locates the annular magnet 211 in the front end of the cavity 110, and the diameter of the annular magnet is slightly bigger than the diameter of the probe tip 120, preventing the collision from the probe tip 120. The magnetic inductive switch 112 installed in the circuit board 113, and located in the side panel where corresponds to the location of the annular magnet 211 in the probe holder 310 that corresponds to the location after the placement of the probe 100 in the probe holder 310. The magnetic inductive switch 112 communicates with the host of the electronic thermometer by wires 111, and by the cooperation of the magnetic inductive switch 112 and the annular magnet 211 to judge and detect the motion of the probe, in order to open or close the pre-heating process.

The basic train of thought is to apply the inductive switch to detect the motion of the probe, it is with simple structure, high sensitivity, energy saving and environmental protection. It could be flexibly applied in accordance with the practical application or the requirements of the manufacture, such as the location change of the inductive switch IC and the inductive signal source, the shape change of the signal source and so on. The implementation of the present invention is not limited to the implementation of the above-mentioned, any invention that based on the above basic train of thought, and without the creative work for the replacement or improvement, belongs to the implementation of the invention.

The invention claimed is:

1. An induction type of electronic thermometer probe motion detection device, including a probe and a probe holder; wherein the probe includes a cavity and a probe tip; inside the probe tip has a heating mechanism, wherein the probe tip and the heating mechanism electrically connected with a host of the electronic thermometer by wires; inside the cavity locates a magnetic inductive switch, wherein the magnetic inductive switch communicates to the host of electronic thermometer by wires; a magnetic signal source located in the position of the other side of the probe holder after the placement of the probe, where corresponds to the magnetic inductive switch, and then the magnetic signal source and the magnetic inductive switch composed to the probe motion detection device.

2. In accordance with the induction type of electronic thermometer probe motion detection device described under claim 1 herein and its feature is that the magnetic inductive switch is CMOS magnetic resistance inductive switch, includes mr magnetic resistance element and switch.

3. In accordance with the induction type of electronic thermometer probe motion detection device described under claim 1 herein and its feature is that the magnetic signal source is magnet.

4. In accordance with the induction type of electronic thermometer probe motion detection device described under claim 1 herein and its feature is that the magnetic signal source is annular magnet.

5. In accordance with the induction type of electronic thermometer probe motion detection device described under claim 3 herein and its feature is that the magnet is in ring structure.

* * * * *